United States Patent [19]

Epstein et al.

[11] 3,748,379

[45] July 24, 1973

[54] RUN LENGTH CODING TECHNIQUE

[75] Inventors: Paul Epstein, Brookline; Robert E. Wernikoff, Belmont; James E. Cunningham; George Rosen, both of Brookline, all of Mass.

[73] Assignee: Electronic Image Systems Corporation, Cambridge, Mass.

[22] Filed: Jan. 22, 1970

[21] Appl. No.: 4,902

[52] U.S. Cl. .......... 178/6, 178/DIG. 3
[51] Int. Cl. .......... H04n 7/18
[58] Field of Search .......... 178/DIG. 3; 340/15.5, 347 DD

[56] References Cited

UNITED STATES PATENTS 3,436,723 4/1969 Sauit .......... 340/15.5

OTHER PUBLICATIONS

Schreiber et al., Synthetic Highs -An Experimental TV Bandwidth Reduction System, Aug. 1959, Journal of SMPTE, Vol. 8 pp. 525-537.

*Primary Examiner*—Robert L. Griffin
*Assistant Examiner*—Joseph A. Orsino, Jr.
*Attorney*—Russell L. Root and Rines and Rines

[57] ABSTRACT

In run length coding sequences of message symbols, a first group of code words in the code word vocabulary is used to describe a group of consecutive run lengths of from one to a maximum length determined by the number of code words in the first group. A second group of code words in the vocabulary is used to describe segments of longer run lengths, one code word of the second group describing a segment of a length equal to the maximum run length which the first group of code words can describe, the other code words of the second group describing run length segments substantially longer than the maximum run length which can be described by the first group. Preferably the segments described by the second group of code words are chosen in accordance with the expected statistical distribution of the longer run lengths to minimize the expected number of code words required to describe such longer sequences of message symbols. One notable feature of the technique is that any length run can be coded in a reasonably efficient fashion, even though its occurrence may not have been foreseen, for the second group of code symbols provides a self-extending coded description.

22 Claims, 2 Drawing Figures

PAUL EPSTEIN
ROBERT E. WERNIKOFF
JAMES E. CUNNINGHAM
GEORGE ROSEN
INVENTORS
BY [signature]
ATTORNEY

PAUL EPSTEIN
ROBERT E. WERNIKOFF
JAMES E. CUNNINGHAM
GEORGE ROSEN
*INVENTORS*

BY James E Hawes
*ATTORNEY*

RUN LENGTH CODING TECHNIQUE

BACKGROUND

Since binary message symbol sequences often exhibit a wide variety of consecutive, identical symbol runs, to efficiently code such message sequences the coding technique employed must be able to efficiently represent both very short and very long runs. One conventional coding technique, called run length coding, uses the code words of the code vocabulary to describe in consecutive order the consecutive sequences, or runs, of identical message symbols, from the shortest possible run up to a maximum run length determined by the number of code words in the vocabulary. Thus, should any message symbol sequence of a length equal to or less than this maximum run length occur in the message, only one code word is required to describe the sequence. However, longer runs must be described by multiple code words. Since the distribution of different run lengths cannot be accurately predicted in advance for most message sequences, and even typical message sequences will include different lengths and numbers of message symbol runs, the manner in which such longer runs are described by the coding technique is a major determinant of ultimate coding efficiency.

There are at least two coding techniques for describing long runs of message symbols using multiple code words. One technique adds to each code word a symbol representative of the binary value of the message symbol sequence the code describes. For example, if the message symbols in the sequence were derived in a facsimile system by scanning a white document bearing black marks of information, the code symbol added to each code word would convey to the decoder the black or white color value of the run of message symbols described by the code word. Should there occur a message symbol sequence longer than the maximum run length which the code word vocabulary is able to describe by a single code word, successive segments of the run would be described by successive code words, each code word being accompanied by the same type of added color representing symbol. The decoder would then reconstruct this long message symbol sequence as a series of shorter sequences of message symbols having the same color value. However, this coding technique requires adding a color value symbol to each code word, which substantially expands the coded message, thereby reducing the efficiency of the coding technique.

Another coding technique for representing very long runs assigns all but one code word in the vocabulary sequentially to runs from one to some maximum length, and uses the remaining code word to represent a maximum length run segment of a longer, continuing run. Since the message symbols can have only one of two values, the runs of message symbols must alternate in binary value. Using this inherent characteristic the decoder can simply produce sequences of symbols whose value is changed after each code word which completely describes a run. When the decoder encounters the continuing run code word in the coded message, since this code word does not completely describe a run, the decoder will produce a maximum length run of message symbols then, by continuing to produce message symbols of the same value, add the sequence of message symbols described by the next code word to the message symbols described by the preceding code word. While this technique reduces by one the consecutive sequences of message symbols the code vocabulary can describe with one code word, when compared to the first technique the effect of this reduction is usually more than offset by the elimination of the color value representing symbol which otherwise would be added to each code word, making the second coding technique appreciably more efficient than the first for most messages.

Both of these coding techniques for describing very long runs with multiple code words are limited to a given maximum run length which can be described by a single code word, the maximum run length being determined simply by the number of code words in the particular code vacabulary. Because very long sequences of identical binary value message symbols will occur occasionally in most any message to be run length coded, it is desirable to be able to describe such sequences with as few code words as possible. For this reason, it is desirable to use a reasonably large set of code words as the coding vocabulary. However, if the code words all are formed by the same number of code symbols, as is often preferred, then as the size of the code vocabulary increases, the number of code symbols used to describe short runs also will increase. On the other hand, since in most message symbol sequences short run lengths usually occur much more often than very long run lengths, it is desirable to use a reasonably short code word vocabulary. The dilemma faced by the coding system designer in selecting a given code word length for the coding vocabulary, then, is that on the one hand a reasonably long code word is preferable for the very long runs which are likely to occur occasionally in most any message symbol sequence, while on the other hand a reasonably short code word provides a more succinct description of the larger number of shorter run lengths which are likely to occur in typical message symbol sequences.

A main object of the invention is to resolve this dilemma by providing a coding technique which, in a reasonably efficient fashion, will describe both short and long runs; other objects will appear from the following detailed description of the invention.

BRIEF DESCRIPTION OF THE INVENTION

Rather than simply using the different code words of a given code vocabulary to describe, in consecutive order, the consecutive sequence of run lengths which may be produced by a given message symbol source, the coding technique of the present invention divides the code words into at least two groups. A first group of code words in the code vocabulary is used to describe a group of consecutive run lengths of from one to a maximum length determined by the number of code words in the first group. A second group of code words in the vocabulary is used to describe segments of longer run lengths, one code word of the second group describing a segment of a length equal to the maximum run length which the first group of code words can describe, the other code words of the second group describing run length segments substantially longer than the maximum run length which can be described by the first group. Should a very long run occur, code words of the second group will be used to describe consecutive segments of the run until the final portion of the run can be described by one of the code words in the first group. In this manner, the coding technique is able to describe any possible run, whatever its length and even though it may not have been anticipated. The more probable shorter runs are described by using a single code word, while the less probable longer runs are described by using a plurality of code words assembled according to a predetermined methodology to provide a self-extending coded description. In addition, the coding technique permits very long runs to be coded even while the run is continuing, provided it has exceeded a given length, and the communication channel thereby to be continually supplied with code words even while very long runs are being processed.

To simplify the system, preferably the code words all include the same number of binary symbols; thus, the total number of code words in the code vocabulary will be a power of the base two. Also, preferably the segments described by the code words of the second group are not merely consecutive integer multiples of the maximum run length described by the first group, but rather are chosen in accordance with the expected run length statistics of the family of message symbol sequences to be coded to minimize the expected number of code words required to describe the message sequences.

The disclosed system, which employs this run length coding technique, includes circuitry for counting the number of consecutive, identical binary message symbols in each message symbol sequence. The total count for each sequence is examined by a logic circuit, and if found to represent a run which is no greater than the maximum length run which can be described by a single code word of the first group, the total is supplied as the output of the coder with sufficient higher order bits as necessary to form a code word of predetermined length. If the total is found to be greater than the maximum length run, the logic circuit then describes the run segment by segment, forming the coded description in a self-extending fashion using code words of the second group. Preferably, although not necessarily, very long runs are described by using as the first code word that code word of the second group which describes the longest possible segment which is still shorter than the total run length, subsequent code words describing shorter and shorter segments as appropriate, each less than the remaining portion of the run legnth, until the final portion of the run length can be described by one of the code words of the first group, completing the description of the run. It is not necessary to reach the end of the run before coding can begin. Should an associated system, such as the communication channel, require additional code symbols while the length of a very long run is still being counted, one or more code words of the second group can be supplied to it, provided the run has exceeded the length described by the code words; upon reaching the end of the run, the coding system will produce one or more code words, concluding with a code word of the first group to complete the description.

To reconstruct the original message symbol sequence, the decoder simply generates the runs of message symbols described by the sequence of code words. For example, if the code word is found to be of the first group, it is supplied to a counter circuit which is then decremented to zero, the decrementing producing a sequence of appropriate binary value output symbols to duplicate the message symbol sequence described by the code word. If the code word is found to be of the second group, the run length segment represented by the code word is entered as a binary number in the counter circuit and the counter circuit again decremented to zero, the decrementing producing a sequence of appropriate binary value output symbols. Since each code word of the first group completes the description of a run, after each code word of the first group appropriate control circuitry is actuated so that the next sequence of output symbols will be of the binary value opposite to that of the immediately preceding output symbols. In this manner, then, the system describes each run of successive, identical symbols occurring in the message symbol sequence using the disclosed coding technique, and reconstructs from this coded description a sequence of output symbols duplicating, in number and value, each successive sequence of symbols in the original message.

BRIEF DESCRIPTION OF THE DRAWINGS

The preferred embodiment of the invention will be described in connection with the accompanying drawings in which.

DESCRIPTION OF THE INVENTION-INTRODUCTION

Figure 1:
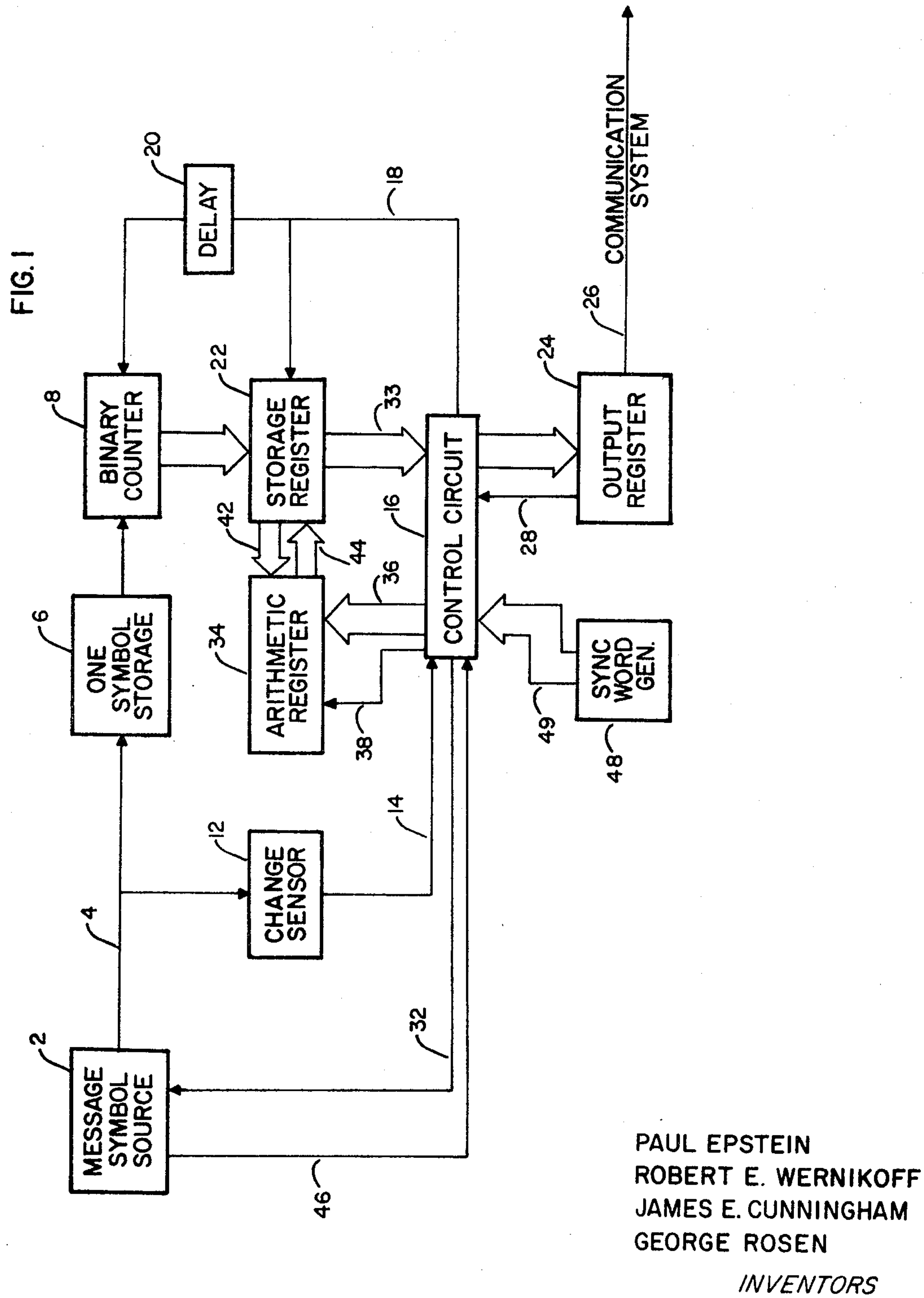
FIG. 1 is a block diagram schematically illustrating the construction of a system for coding sequences of message symbols.

In describing the invention, it is necessary to refer to specific embodiments, and they of course should be related to a real environment. While any of a number of different applications for the system could be given, hereafter in this description the system will be related, at least in thought, to sequences of message symbols produced in a facsimile system by rectilinearily scanning a white document bearing black marks. Successive message symbols will represent the black or white value, or brillance, of successive incremental areas viewed along the scan line. Consecutive sequences of message symbols will alternate between the black and white values, the number of message symbols in each sequence corresponding to the length of the associated black or white portion of the scan line. These sequences of message symbols will be coded and communicated to a decoder, which in response reconstitutes from the coded communication sequences of output symbols duplicating those in the original message. If desired, a facsimile of the original document may be produced from these reconstituted sequences. Since appropriate electrical circuits for accomplishing each separate function required by the disclosed system are known to those skilled in this art, the details of these circuits will not be illustrated or described; rather, each circuit simply will be schematically illustrated, and only its functional relationship in the system will be described. The efficiency of the coding technique will be judged by the succinctness of the coded communication; the succinctness of the coded communication may conveniently be determined by comparing the number of symbols in the message with the number of code symbols in the coded communication.

DETAILED DESCRIPTION OF THE FIG. 1 SYSTEM

In the system schematically illustrated in FIG. 1, a sequence of message symbols, which as previously noted may be the successive symbols or pulses of amplitude levels corresponding to the successive black or white elemental areas along a line being scanned across a white document bearing black characters, are produced by a message symbol source 2 and supplied over an appropriate electrical conductor 4 (hereinafter termed simply a line) through a one symbol storage circuit 6 to increment a binary counting circuit 8. As will be readily understood by those skilled in this art, the circuits for performing counting and other functions may be of any conventional type as, for example DEC type R202 flip-flops and R111 expandable NAND/-NOR gates manufactured by the Digital Equipment Corporation of Maynard, Mass. and described on pages 149 and 161 of the Digital Logic Handbook pulished in 1968 by the Digital Equipment Corporation. The binary counter 8 has adequate counting capacity to present, at any instant, the binary total of the number of pulses, or message symbols, which it has accepted since it was last cleared, or reset, from a total of one to a maximum total equal to the number of successive, elemental areas along the scan line.

The sequence of message symbols also is supplied over the line 4 to a change sensor circuit 12. This circuit compares successive pulses and senses a change in binary value from one pulse to the next. In a facsimile system, such a change indicates passage of the scanning beam from an incremetal area of one color value, e.g., white, on the document to an incremental area of another color value, e.g., black. In response to the pulse heralding each such change, the change sensor circuit 12 produced a change signal, or pulse, which is supplied over a line 14 to a control circuit 16. Thereupon, the control circuit may, if other conditions which will be described are met, produce a signal on a line 18. This signal is supplied to a storage register 22 and causes it to read and store the accumulated binary total of the counter 8. The storage register may comprise, for example, a sequence of DEC type R202 flip-flops, manufactured by the Digital Equipment Corporation and described on page 161 of the 1968 issue of their publication entitled Digital Logic Handbook. After a brief delay, imposed by a delay circuit 20 and sufficient for the reading operation of the storage register, this signal also is applied to the binary counter 8 and resets it to a predetermined initial state, such as all zeros, thereby clearing the counter of all previously accumulated information and readying it to count the next run of consecutive, identical message symbols. In this fashion then, the binary counter accepts and totals each run of consecutive, identical message symbols; in response to a changed message symbol, signalled by the change sensor circuit, the binary total of the counter is read by the storage register 22, then the binary counter is reset to begin counting the next run of message symbols.

While the message symbols of the next run are being counted, the control circuit 16 formulates a code symbol sequence, using the preferred coding strategy described herein, and supplies the sequence of code symbols to an output register 24. The output register in turn supplies these code symbols one by one over a line 26 to a communication system. The communication system may, for example, include a telephone circuit and a transmitting modem for converting the code symbol sequence into a signal appropriate to the telephone line, and a receiving modem for reconverting the transmitted signals into a code symbol sequence for the decoding system which will presently be described. Generally, the message to be communicated is transmitted as a continuous series of code signals without interruption, to minimize communication time and to prevent the ambiguities which would arise if interruptions occurred in the coded communication. For these reasons, in this application the coding system should formulate code messages faster than they can be communicated. Because most coding techniques can only encode complete runs, not partial runs, this required timing relationship between the coding and transmission systems imposes a substantial restraint on system design. In constrast, since the new coding technique herein disclosed permits the coded description of long runs to be partially formulated even before the end of the run is reached, as will be shown presently, a system using this coding technique need not of necessity employ high speed circuitry to accommodate relatively low speed transmission channels, while if high speed circuitry is used the coded description may be formulated fast enough by the system to accommodate even high speed transmission channels.

The output register supplies a demand signal over a line 28 to the control circuit only when additional code symbols can be accepted, and the control circuit is internally constrained to only supply code symbols to the output register when the demand signal is present. To prevent overflow of the output register and loss of code symbols. Should the control circuit formulate the next code word before it can be accepted by the output register, as will happen, absence of the demand signal on line 28 causes the control circuit to supply an interrupt signal over a line 32 to the message symbol source. To maintain the dominance of the control circuit, preferably the signal on line 32 consists of a sequence of pulses, the message symbol source responding to each pulse by supplying a single message symbol on its output line 4. Alternately, the interrupt signal may simply consist of a level. In either case, when the pulses cease or the interrupt level is present the message symbol source stops supplying successive message symbols over line 4. The coding system then pauses in this condition until the output register can accept the next code word, which condition is heralded by the demand signal on line 28. The control circuit then supplies the already formulated code word to the output register and calls for more message symbols from source 2, and the system resumes its counting and coding actions. Of course, others skilled in this art may prefer to satisfy these timing and interface requirements in a different fashion.

As previously indicated, the code vocabulary consists of a number of code words, each code word preferably being composed of the same number of code symbols as all other code words in the vocabulary. For example, the code vocabulary may consist of the 32 different code words which can be formed by a series of five binary value symbols. One of the code words is used to represent a maximum length but incomplete description of a run. At least one other of the code words is used to represent a portion of a run much longer than the otherwise maximum length run. In other words, the 32 code words of the vocabulary may be thought of as being divided into two groups; the first group of code words may include the five-symbol code words representing the binary counts of 1 to, say, 30 which in turn may represent the run lengths of 1 to 30 symbols respectively; the second group of code words then will include the code word 31, which may represent a run segment of, say, 60 successive identical message symbols, and a code word 32 which may represent a run segment of 30 message symbols. Thus, a run of from 1 to 30 message symbols may be represented by a single code word of five code symbols selected from the first group; a run of 31 to 60 message symbols may be represented by two five symbol code words, the first 30 message symbols being represented by the code word 32 selected from the second group, and the remaining 1 to 30 message symbols in the run by a second code word of five symbols selected from the first group. A run of 61 to 91 message symbols also can be represented by two code words; the first 60 symbols being represented by the code word 31 selected from the second group, and the remaining 1 to 30 message symbols in the run by a second code word selected from the first group. As a result, simply by using one of the code words of the vocabulary to represent the segment of a run much longer than the otherwise maximum length run which could be described by the code vocabulary, that is, to represent a multiple maximum length run, it is possible to extend appreciably — actually by about 50 percent in the previous example — the descriptive capability of the code vocabulary. While it is true that using one of the code words to describe a multiple maximum length run does reduce by one the number of consecutive runs which can be described by the remaining code words, since particularly in facsimile applications typical run length distributions are markedly peaked about the shorter run lengths and are fairly uniform or constant for all longer runs in the tail portion of the probability distribution, run length code vocabularies typically are chosen to describe all of the shorter, higher probability runs with just one of the code words. Accordingly, the reduction occasioned by using one of the code words to describe a multiple maximum length run costs nothing, in terms of additional code symbols transmitted, for all runs shorter than the new maximum length run. The reduction will only require communication of additional code symbols when the shorter code word vocabulary can not completely describe with one code word a run which could have been described by one word of the older, longer code word vocabulary. Because of the typical probability distribution and code word length choices, this happens so seldom, though, that the cost of the reduction is negligible, particularly when compared with the large extension of the descriptive capability of the code vocabulary using the same number of code words which is realized by using one or more of the code words to represent multiple maximum length runs. This is a major advantage over prior coding strategies.

In a facsimile application the first group of code words, those which describe the group of consecutive run lengths, may be thought of as stepping the receiver along an interval on the facsimile corresponding to the run represented by the code word. Similarly, the code word or words in the second group previously referred to as describing multiple maximum length runs may be thought of as jumping the receiver across an interval on the facsimile much larger than that stepped off by the first group of code words. Since referring to these code words in the second group as multiple maximum length code words is, to say the least, cumbersome, they will for the most part hereafter be referred to simply as jump code words.

As will be readily apparent to those skilled in this art in view of the preceding disclosure, it is quite possible to design the coding strategy to use more than one jump code word. For example, if two code words are used to represent multiple maximum length runs, a run of one code word might represent 58 and the other a run of, say, 87 message symbols. If this were done, then any run of from 1 to 29 consecutive, identical message symbols could be represented by one code word, and any run of from 30 to 117 message symbols could be represented by two code words. To describe shorter runs with fewer code words and longer runs with longer code words it is necessary to choose jump code words carefully so that they neither overlap nor leave gaps in the series of runs a minimum number of code words can be combined to describe. As evidenced by the previous example, when so chosen the jump code words are not simply powers of the base two. As a result, when a jump code word is used, the arithmetic operations which must be performed to compute the remaining run lengths, and to represent the sequence of symbols conveyed by the jump code word, are not as a simple as they would have been had the jump code word been chosen as a power of two. Choosing the jump code words to represent runs of lengths which are powers of two, such as 32, 64, etc., will leave gaps in the series of runs increasing numbers of code words can be combined to describe. However, such a choice simplifies considerably the arithmetic operations which must be performed in the encoder when a jump code word is used to compute the remaining run length, and it also appreciably simplifies reconstitution of the message symbol sequence at the decoder. In some systems such a simplification may be preferred; in the disclosed system a different choice is preferred. It will now be described.

In the preceding coding strategy example, the advantages which result from employing at least one code word of the vocabulary to describe multiple maximum length runs have been indicated. If the maximum run which the remaining code words can describe is, say, 30, as in the first example, then it seems quite appealing, and perhaps even natural, to use the jump code word to describe the first 60 symbols of a longer run. Such an assignment avoids both overlaps and gaps in the series of runs which a minimum number of code words can be combined to describe. For example, if the jump code were used to describe a run of 64, rather than 60 consecutive identical message symbols, then to describe runs of from 61 to 64 message symbols would require three code words, whereas to describe runs of from 65 to 94 message symbols would only require two code words. The natural appeal of choosing the jump code word so that as the length of the run to be described increases, the number of code words required also monotonically increases, masks a much more important advantage which can be obtained by a notably different use of the jump code words.

In the preceding examples of possible coding strategies employing the disclosed coding technique, the jump run length choice reflected the classical desire to describe shorter runs with fewer code words, and the traditional acceptance of ever increasing cost, in terms of code symbols, to describe increasingly longer runs of message symbols. While at first glance it may seem quite reasonable to describe longer and longer runs with more and more code symbols, for most applications such a choice proves to be far from an optimum choice. Ample statistical evidence indicates that in a facsimile system, while shorter runs are considerably more probable than longer runs, all runs beyond some run length occur with almost equal probability; that is, the probability distribution curve for most all message sources is substantially humped over the shorter run lengths and that beyond some run length the tail of the probability distribution curve is linear and horizontal, or almost horizontal. Because of this typical characteristic, the optimum jump code run length choices are not just consecutive interger multiples of the maximum run length which can be described by a single one of the remaining code words of the vocabulary. Rather they are considerably different values, values dependent on such factors, besides the expected distribution of run lengths, as the number of jump code words used, the code word length, and the maximum possible run length. In other words then, the classical tradition of describing ever longer run lengths with an ever increasing number of code words leads to a notably poor selection of jump code run lengths. If all code words contained an equal number of symbols, as is assumed in the preferred strategy, then to minimize the number of code symbols required to describe the message symbol sequence, the jump code word length or lengths must be chosen to reflect the probability distribution of the longer run lengths. In a typical facsimile application, for example, which scans conventional letter-size documents bearing typewritten, handwritten, or drawn information at reasonably high horizontal resolution (e.g., 200 bits per inch), the run length probability distribution typically will be linear and horizontal, or very close to it, beyond runs of about 30 or 40 message symbols. If vertical advances of the scan along the document is identified in the transmitted code symbol sequence by a synchronizing signal, and the direction of the horizontal scan is generally parallel to the short side of a letter-size document, then no run length can contain more than the maximum number of message symbols derived during one scan, which according to the previous assumptions will be about 1,700 message symbols. Therefore, it can be shown that if just on jump code word is used, then to minimize the number of code symbols sent the best run length segment for the jump code word to represent will be on the order of 226 consecutive symbols. This is considerably different than the 60 symbol run length which otherwise might have been used. Similarly, if two jump code words are used, it can be shown that to minimize the number of code symbols sent the two jump code words should represent run length segments of about 113 and 437 consecutive message symbols, while if three jump code words are used they should represent run length segments of about 78, 218, and 610 consecutive message symbols. These minimum values are not sharply defined but rather represent a calculated optimum value centered in a fairly broad range of minimum values. While the actual probability distribution for message symbol sequences derived from most any document is probably linear, or close to linear, in the tail portion for runs beyond a certain value, as assumed in the foregoing calculations, all runs are not equally probable. Rather, longer runs are usually somewhat less probable than shorter runs, and the probability distribution will exhibit a slight downward slope for increasingly longer runs in the tail portion. Since this downward bias lowers the optimal calculated value for the jump run, it is preferable to pick an actual jump run length value somewhat less than this calculated value, conveniently a value which is an integral multiple of the maximum run length which can be described by one of the first group of code words of the code word vocabulary, but still a value which substantially minimizes the expected number of code words required to represent the run lengths. In light of these considerations, then, the disclosed coding system will employ a code word vocabulary composed of 32 five symbol code words, the first group of 29 code words being used to represent run lengths of from 1 to 29 message symbols, the second group including the 13th code word which will be used to represent the first, or the next, 29 message symbols of a longer run of message symbols, the 31th code word representing the first, or next, 87 message symbols of a longer run, and the 32nd code word (which may be all zeros) representing the first, or next, 460 message symbols of a longer run. Clearly, a different coding vocabulary or division of the chosen vocabulary should only be considered as an example of a jump code word vocabulary, preferable in light of the assumptions previously stated.

Returning now to the description of the operation of the coding system, in coding the run length total accumulated in the binary counter and previously transferred to the storage register 22, the total is first sensed by the control circuit 16 over lines 33. For this purpose the control circuit may use a series of comparator circuits, each testing the stored total to determine if it exceeds one or more of the jump run lengths. By interrogating the output of a simple decision network included within the control circuit and connected to the comparators, the largest jump run which will fit within the stored total is indicated. If the stored total is 29 or less, the five lowest order binary symbols in the register, which symbols will include the bits required to represent the binary total and sufficient higher order bits to complete the five symbol code word, are supplied to the output register 24 as the code symbols. If, however, the total is indicated to be greater than 29, but no greater than 87, then in accordance with the coding strategy previously described the control circuit internally generates the five symbols representing the binary number 30 and supplies these symbols to the output register as the code word. The control circuit also internally generates the binary number 29, which it supplies to an arithmetic register 34 over lines 36 together with an actuation pulse over a line 38. The arithmetic register is connected to the storage register 22 by lines 42 and 44, the arithmetic register receiving the total stored in the storage register over lines 42 and supplying a new total to the storage register over lines 44. In response to the actuation pulse from the control circuit, the arithmetic register acquires the total held in the storage register over lines 42, subtracts from this acquired total the binary count supplied by the control circuit over lines 36, then transfers the new reduced total over lines 44 to the storage register, the transferred total being superimposed on and replacing the former total held in the storage register 22. As a result of this action, the total formerly held in the storage register 22 is reduced by an amount equal to the binary number supplied by the control circuits to the arithmetic register over lines 36, in this case by 29.

The control circuit then again senses the binary total held in the storage register 22. If the total is now 29 or less, the binary symbols representing the total are supplied by the control circuit to the output register 24 as the code word; if the total is greater than 29, the control circuit again generates and supplies a code word representing the binary count 30 to the output register, and again causes the arithmetic register to reduce the count held in the storage register by 29, operating as previously described. Because the total originally assumed to be held in the storage register was no greater than 87, no more than two of the jump code words will be supplied to the output register. The third code word supplied to the output register must complete the description of the run length originally held in the storage register and will be one of the code words of the first group.

While the description of the binary total held in the storage register is proceeding, the message symbol source continues to supply message symbols through the one symbol storage circuit 6 to the binary counter 8, causing the binary counter to accumulate a total representing the number of message symbols in the next run. Should this next run conclude before the control circuit had completed the coded description of the previous run, the conclusion would be sensed by the change sensor 12 and a signal conveyed to the control circuit 16 over line 14. In response, the control circuit would halt production of message symbols by the message symbol source 2 by supplying a signal over line 32 to the message symbol source. On completion of the description of the binary total previously held in the storage register, the control circuit then causes the storage register 22 to acquire the binary total held in the binary counter 8, which total describes the next run, and clears the binary counter, by supplying a signal over line 18 as previously described. Thereafter the control circuit permits the message symbols through the one symbol storage circuit to the binary counter, causing the binary counter now to accumulate a total describing the next run of message symbols.

Assume now that the total held in the storage register, and describing the next run length is greater than 87 but less than or equal to 460. As before, the control circuit senses the total held in the storage register over lines 33, and finding the total to exceed 87 but not to exceed 460 responds by internally generating and supplying the binary count 31 as the code word approximating the run length to the output register. The control circuit also internally generates the binary count 87 which it supplies to the arithmetic register over lines 36 together with an actuation signal over line 38. In response, operating as previously described the arithmetic register reduces the total previously held in storage register 22 by a count of 87. This new, reduced total held in the storage register is again sensed by the control circuit. If it still is greater than 87, the control circuit again generates the binary total 31 which it supplies as a code word to the output register and repeats the subtraction process by again supplying the binary number 87 and an actuation signal to the arithmetic register. When the binary total held in the storage register 22 has been reduced by this successive approximation process to a count of 87 or less, the control circuit proceeds as previously described, internally generating as the code word the binary number 30 if the total is greater than 29 until the total is less than 29, then supplying the 5 bits representing the final remainder of 29 or less to the output register as the final code word to complete the description.

Assume now that the sequence supplied by the message symbol source consisted of more than 460 consecutive, identical message symbols. As before, the resulting total accumulated by the binary counter 8 and transferred to the storage register 22 will be sensed by the control circuit 16 over lines 33. In response, the control circuit will internally generate the binary number 32 and supply it as the first code word to the output register 24. The control circuit will also internally generate the binary number 460, which number it supplies to the arithmetic register 34 over lines 36 together with an actuation signal on line 38, causing the arithmetic register to reduce the total held in the storage register by a count of 460, operating as previously described. Should the reduced total now held in the storage register still exceed 460, the successive approximation or self-extending description process is repeated until the total no longer exceeds 460. If the total now exceeds 87, the control circuit operates as previously described, generating the code word represented by the binary count of 31 and simultaneously reducing the total held in the storage register by 87 until it no longer exceeds 87. If the reduced total now exceeds 29, the control circuit generates the code word represented by the binary number 30 and supply it to the output register while simultaneously reducing the count held in the storage register by 29 until it no longer exceeds 29. This remainder of 29 or less the control circuit supplies as the final code word to the output register to complete the description of the previously assumed run length.

Operating in this manner the coding system shown in FIG. 1 encodes the successive runs of identical message symbols produced by the message symbol source 2, describing the typical short runs with single code words and each occasional long run with only a few code words. Should a very long run occur, the output register may supply a demand signal over line 28 before the end of the run is reached and a change signal occurs on line 14. However, the rate at which a run is counted by the system is sufficient to insure that at least the maximum length run which can be described by the first group of code words has been exceeded before a demand signal can occur. Thus, the control circuit may and does respond to this premature demand signal by interrupting the flow of message symbols, then transferring the partial run length count accumulated by the binary counter 8 to the storage register 22 and clearing the counter, then reestablishing the flow of message symbols to the counter. Since the partial run length count held in the register exceeds the maximum length run which can be described by the first group of code words, the control circuit will respond to the count by internally generating and supplying to the output register an appropriate jump code word representing the maximum length run which is still less than the length represented by the partial count. The control circuit then transfers the partial count to the arithmetic register and reduces the count by the amount represented by the jump code word supplied to the output register, operating as previously described. When the end of the run has been reached, the count representing the remainder is transferred by the control circuit from the counter to the storage register 22, then because of the previous premature demand condition this count whatever its magnitude is transferred directly to the arithmetic register 34 where it is added to the reduced partial count. The resulting total is entered in the storage register and the system resumes operation as previously described, sensing the count now held in the storage register then either supplying it or an internally generated code word to the output register on demand. Of course, should the next demand signal also occur before the end of the run was reached, another partial run length count would be transferred to the storage register and, after the appropriate jump code word had been supplied to the output register, this second partial count would be transferred to the arithmetic register, reduced by an appropriate amount then added to the first reduced partial count still held in the arithmetic register. As the previous example suggests, the sequence of jump code words used to described a single long run length of message symbols need not represent segments of descending length. If the communication system transmits signals at differing rates, it is possible for a jump code word representing a shorter portion of a run to precede a jump code word representing a longer but subsequent portion of the same run.

On completion of the message symbol source sequences, as may occur for example at the end of a scan line, the message symbol source supplies a signal over line 46 to the control circuit. In response, the control circuit may describe the final run length represented by the total just accumulated in the binary counter, operating as previously described; alternately, in some systems the control circuit may omit this final description if the concluding run can be deduced at the decoder by previously supplied information, as often is true in facsimile systems. In either event, after supplying the final code word to the output register, the control circuit then accepts the sequence of binary symbols generated by a synchronizing word generator 48 and supplied over lines 49, and supplies this sequence to the output register 24,thereby adding the synchronizing code word to the coded communication. In typical facsimile applications, the message symbol source vertically advances during this synchronizing interval to the next horizontal area in preparation for generating the next group of the message symbol sequences. After the control circuit supplies the synchronizing code word to the output register it then supplies a signal over line 32 permitting the message symbol source to resume supplying message symbols to the coding system, and the system codes the next group of message symbol sequences, operating in the manner previously described.

The ability of this coding technique to describe any length run in a reasonably efficient fashion is a particularly notable advantage in certain applications. While the maximum length run which can occur in a facsimile application is normally defined by the maximum document size which can be scanned, in other applications such as encoding sensor data it may not be possible to define a maximum length run. In fact, if the actual conditions being sensed are quite different than the conditions assumed in designing the coding system, the flexibility of the present coding technique may salvage an otherwise inoperative system. Indeed, because the present coding technique provides a methodology, or syntax structure, for describing in a reasonably efficient and self-extending fashion a wide variety of different message signals or sequences with one or more code words, even sensor conditions undreamed of when designing the system can be conveyed by the present coding technique.

DETAILED DESCRIPTION OF THE FIG. 2 SYSTEM

Figure 2:
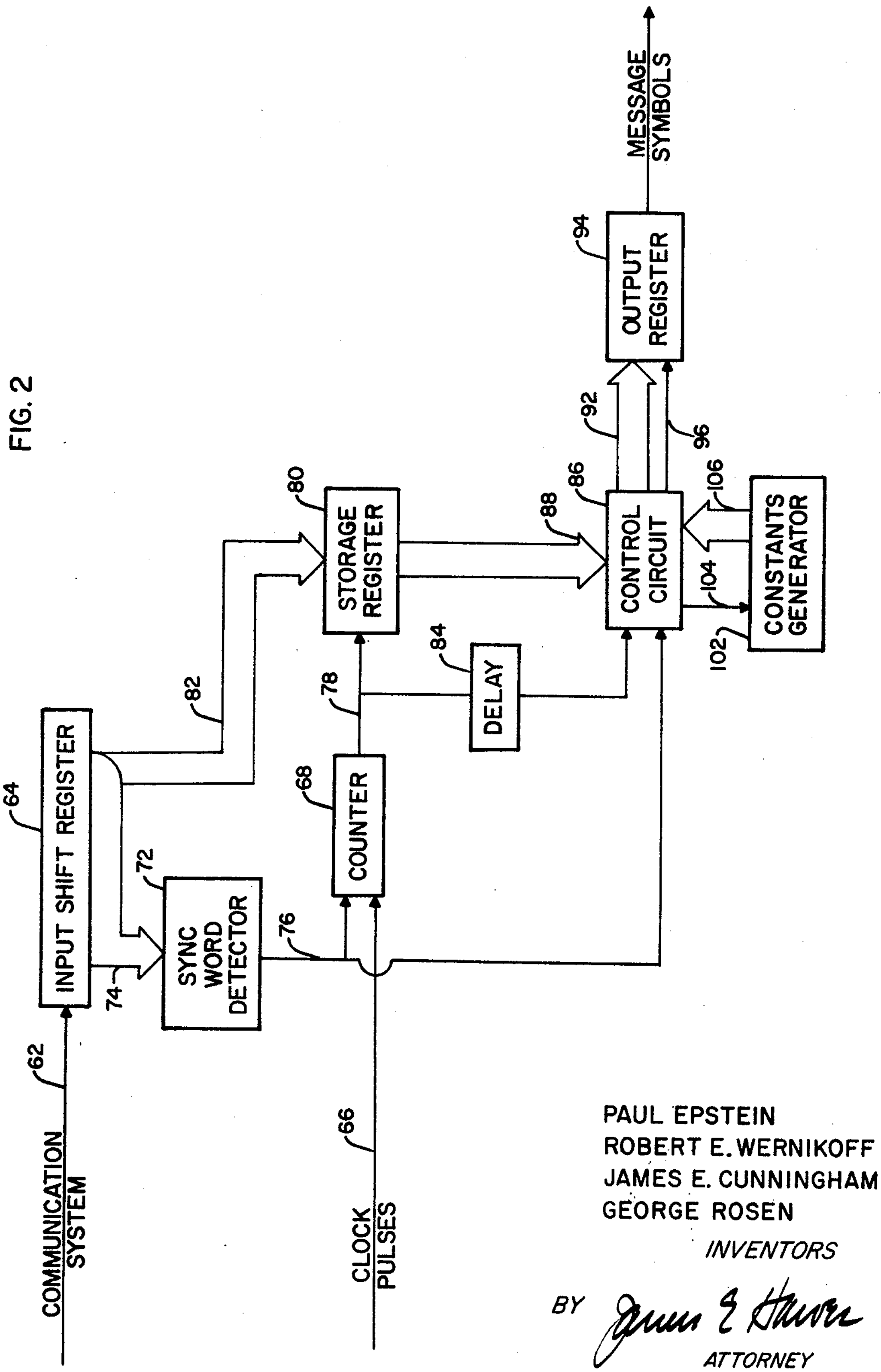
FIG. 2 is a block diagram of a system for decoding the sequences of code symbols produced by the coding system of FIG. 1 to generate sequences duplicating those in the original message.

Sequences of code symbols eminating from the output register 24 are supplied over the communication system 26 to the decoder system shown in FIG. 2. As previously mentioned, the communication system may be a pair of modems coupled through a telephone network, in which case typically the code symbols are supplied to the decoder system together with clock pulses derived from the coded communication, the successive clock pulses signalling the occurrence of each successive code symbol. The code symbols are supplied over a line 62 to the input shift register 64 shown in FIG. 2, while the clock pulses are supplied over a line 66 to a binary counter 68. As those skilled in this art will readily appreciate, the shift register may comprise, for example, a sequence of DEC type R202 flip-flops described on page 161 of the previously cited *Digital Logic Handbook* issued in 1968, while the counter may comprise, for example, DEC type R202 flips-flops and R111 expandable NAND/NOR gates described on pages 149 and 161 of the 1968 *Digital Logic Handbook.*

For reasons which will be apparent to those skilled in this art, typically the synchronizing code word is appreciably longer than the code words which describe run lengths, and is transmitted reasonably often to ensure synchronization of the decoding process with the encoding process. A synchronizing code word detector 72 is included in the decoder system, and connected to the input shift register 64 by lines 74. The detector may comprise, for example, a sequence of DEC type R111 expandable NAND/NOR gates and R001 diodes described on pages 147 and 149 of the *Digital Logic Handbook*, published in 1968 by the Digital Equipment Corporation.

The synchronizing word detector, on sensing the appropriate synchronizing code word sequence of binary symbols in the input shift register, responds by supplying a reset signal over lines 76 to the counter 68. This reset preferably loads a binary number equal to the number of symbols in the synchronizing code word into the counter 68. Subsequent clock pulses decrement the counter to a count of zero, causing the counter to produce an output signal on line 78. Alternatively, the reset signal may clear the counter, and the subsequent clock pulses increment the counter until it reaches a total equal to the number of code symbols in the synchronizing code word. In either case, when sufficient clock pulses (corresponding to received code symbols) have occurred to result in an output signal from the counter, signalling that the synchronizing code word has now been shifted through the input shift register and that the first code word following the synchronizing code word is in a position to be read, the output signal from the counter 68 is applied over line 78 to a storage register 80, causing the storage register to read the first code word in the shift register over lines 82, and to retain this code word for subsequent operations. The storage register may consist of a sequence of DEC type R202 flip-flops, for example, described on page 161 of the 1968 *Digital Logic Handbook* text previously cited, as will be apparent to those skilled in this art.

The output signal from the counter is also supplied through a delay line 84 to a control circuit 86, causing the control circuit to sense over lines 88 the code word just read and now held in the storage register. If the control circuit for example using the above-referenced comparators and decision network, indicates that this code word represents a binary number of 29 or less, the control circuit supplies the code word directly over lines 92 to an output register 94. In response, the output register produces a sequence of output symbols and simultaneously decrements the total represented by the code word. Since by convention the code word immediately following the synchronizing code word describes a sequence of white representing message symbols, the control circuit in response to the reset signal over line 76 next supplies a signal over line 96 causing the output register to next produce white representing output symbols. While this decoding operation is proceeding, the counter 68 internally cycles from a count of zero to a count of five, the number of code symbols in a code word, then decrements to zero in response to the clock pulses. When sufficient clock pulses have been received by the counter to decrement it to a count of zero signalling the arrival of the next code word in the input shift register in a position to be read by the storage register 80 over lines 82, the counter again produces an output signal on line 78. As before, this output signal first causes the code word to be acquired by the storage register then causes the control circuit to read the code word.

Assuming now that the code word held in the storage register 80 does not represent a binary number equal to or less than 29, but rather represents the binary number 30, 31, or 32, the control circuit responds by supplying an appropriate signal to the constants generator 102 over a line 104. This signal calls for the binary total which corresponds to the code word, namely a binary total of 29, 87 or 460, which in response the constants generator supplies over lines 106 and the control circuit transfers over lines 92 to the output register 94. Because code words representing the binary numbers 30, 31, or 32 convey an incomplete description of a run and are always followed by at least an additional code word describing a remaining portion of the run, the control circuit does not supply a signal over line 96, as before, and subsequent output pulses will therefore be of the same value as previous pulses, to add to the previous output symbol sequence segment. This process repeats for each subsequent code word from the second group until a code word from the first group, namely of 29 or less, is received to complete or terminate the description of the sequence. This code word from the first group is supplied by the control circuit directly to the output register together with a signal over line 96. Accordingly, after the output register has completed production of the number of output symbols represented by the code word from the first group, as before, it then changes its internal state in readiness to produce a sequence of output symbols of the opposite value, the number of symbols in the next sequence being described by the code word or words received next by the decoder system. This cycle of internal operation repeats until the next synchronizing code word is received, causing the counter to count its passage through the input shift register then to produce an output signal, and the system resumes the decoding operation for the next group of code words. Operating in this fashion the decoder system reconstructs the sequences of message symbols coded by the coding system shown in FIG. 1.

While a preferred embodiment of the invention, including both the process and the system, have been illustrated and described, since different implementations of the disclosed coding techniques may be preferred by others, and since modifications will naturally occur to those skilled in this art, the invention should not be circumscribed by the disclosed embodiments but rather should be viewed in light of the following claims.

What is claimed is:

1. A system for run length coding sequences of consecutive, identical binary message symbols using a binary code work vocabulary having a predetermined number of code words divided into at least two distinct code word groups, the first group of code words representing an ordered group of consecutive, identical message symbols from a run of one to a maximum run of a length determined by the number of code words in the first group, the second group of code words representing selected, nonconsecutive run length segments substantially longer than the maximum run length which can be represented by a code word of the first group, the system including:

means for counting the number of consecutive, identical binary message symbols in each run to accumulate a total representing the run;

storage means for storing the total representing the run;

the counting means proceeding to total the message symbols in the next message run while the storage means holds the total representing the preceding message run;

control circuit means for determining for each run if the total is greater than the maximum run length which can be described by one of the code words in the first group;

means for representing each total determined to be not greater than said maximum run length by one of the code words of the first group;

means for approximating each total determined to be greater than said maximum run length by a code word of a second group which represents a run length segment less than the total;

arithmetic means for reducing the total held by said storage means by an amount equal to the run length segment represented by the code word of the second group and then repeating the determination and the code word generation operation for the reduced total; and output means for accepting the total describing code words.

2. A system for run length coding sequences of message symbols as set forth in claim 1 in which the output means may produce a signal to demand a code word, the counting means in response to the demand signal supplying to the storage means a partial total greater than the maximum run length which can be represented by a code word of the first group, the approximating means supplying to the output means a code word of the second group which represents a run length segment less than the partial total, the arithmetic means reducing the partial total by an amount equal to the run length segment represented by the code word of the second group, the control means adding the count representing a remaining portion of the run length whose first portion was represented by the partial total to the reduced partial total then causing the determination and code word generation sequence to be repeated.

3. A system for run length coding sequences of message symbols as set forth in claim 1 in which the code words all include the same number of code symbols, the code words being divided between the first and second groups, and the message runs selected to be represented by the code words of the second group, in accordance with the expected probability distribution of message runs to substantially minimize the expected number of code words required to represent the message runs, the first group of code words being selected so that consecutive code words represent consecutive binary totals from one to a total equal to the maximum run which may be represented by the first group of code words, the representing means using the message symbol run total held in the storage circuit means as the code word of the first group.

4. In a facsimile system which repetitively scans a document, each successive scan generating binary valued sequences of message symbols, a coding system as set forth in claim 3 including means for signalling the conclusion of each scan to the control circuit means, and means for generating synchronizing code words, the control circuit means adding a synchronizing code word to the code word sequence in response to the signal from the signalling means marking the conclusion of each scan.

5. In a facsimile system as set forth in claim 4 the coding system including means for accepting each code word, means for generating output symbols equal in number and binary value to the message symbols represented by each accepted code word, the facsimile system using the output symbols to produce a facsimile of the scanned document, and means for identifying the synchronizing code word and in response thereto for inhibiting the output symbol generating means until the next code word is accepted.

6. A system for coding messages represented by symbols and wherein said symbols occur in groupings having varying probabilities of occurrence, said system comprising:

means for receiving said symbol groupings;

means for classifying each received symbol grouping into first and second classes according to a predetermined probability of occurrence for each grouping;

means for coding received symbol groupings of the first class into single code words selected from a first code word vocabulary to completely represent said groupings of the first class;

means for coding received symbol groupings of the second class into one or more code words selected from a second code word vocabulary including at least some code words of said first code word vocabulary and additional code words representing preselected portions of the symbol groupings of said second class not representable by code words from said first code word vocabulary; and means for indicating terminating of the coding of the second class of symbol groupings by selecting the last code word therefor from said first code word vocabulary.

7. A system for coding messages represented by symbols and wherein said symbols occur in groupings having varying probabilities of occurrence, said system comprising:

means for receiving said symbol groupings;

means for classifying each received symbol grouping into first and second classes according to a predetermined probability of occurrence for each grouping;

means for coding received symbol groupings of the first class into single code words selected from a first code word vocabulary to completely represent said groupings of the first class; and means for coding received symbol groupings of the second class into one or more code words selected from a second code word vocabulary including at least some code words of said first code word vocabulary and additional code words representing preselected portions of the symbol groupings of said second class not representable by code words from said first code word vocabulary;

said first and second class of symbol groupings comprising groupings of high and low probability of occurrence, respectively.

8. A system for coding messages represented by symbols and wherein said symbols occur in groupings having varying probabilities of occurrence, said system comprising:

means for receiving said symbol groupings;

means for classifying each received symbol grouping into first and second classes according to a predetermined probability of occurrence for each grouping;

a first code word vocabulary having a plurality of code words each corresponding to a predetermined said symbol grouping;

means for coding received symbol groupings of the first class into single code words selected from said first code word vocabulary to completely represent said groupings of the first class;

a second code word vocabulary having a plurality of code words:

at least one code word in said second code word vocabulary corresponding to a symbol grouping not representable by a code word from said first code word vocabulary; and means for coding received symbol groupings of the second class into one or more code words selected from said second code word vocabulary including at least some code words of said first code word vocabulary and additional code words representing preselected portions of the symbol groupings of said second class not representable by code words from said first code word vocabulary.

9. The system for coding messages of claim 8 further including:

decoding means responsive to code words from said coding means and operative to identify code words from said first code word vocabulary;

said decoding means being further operative to generate message symbols for at least a partial message from each code word from said first code word vocabulary and to generate symbols to complete the partial messages from associated code words from said second code word vocabulary.

10. A system for coding messages represented by symbols and wherein said symbols occur in groupings having varying probabilities of occurrence, said system comprising:
means for receiving said symbol groupings;
means for classifying each received symbol grouping into first and second classes according to a predetermined probability of occurrence for each grouping;
means for coding received symbol groupings of the first class into single code words selected from a first code word vocabulary to completely represent said groupings of the first class;
means for sectioning said received groupings of the second class into a first section and one or more predetermined second sections at least some of which correspond to single code words of a second code word vocabulary and which cannot be represented by single code words from said first code word vocabulary; and
means for coding the first and second sections of said received symbol groupings of the second class into code words selected from said first and second code word vocabularies respectively.

11. A system for generating coded representations of magnitudes which are expressed in messages of varying numbers of consecutive elemental units and wherein the probability of occurrence of each number of consecutive elemental units is governed by a probability distribution having a first set of messages for which the numbers of units have a relatively high probability of occurrence and a second set of messages with numbers of units in a relatively low probability portion of the distribution, said system comprising:
means for receiving said messages;
control circuit means for determining whether received messages are of said first or second sets;
first means for coding received messages of the first set with single code words selected from a first group of code words;
a second, different group of code words having code words which represent at least one section of a number of consecutive elemental units for which no code word from said first group is appropriate; and
second means for coding received messages of the second set in sections using consecutive code words, said code words being selected from said second, different group of code words, to represent one or more of said sections not representable by said first group of code words and from said first group of code words to represent one or more of said sections representable by said first group of code words.

12. A system for coding messages as set forth in claim 11 wherein said second coding means, in coding message sections with code words from said second code word group, is operative to select code words representative of sections having substantially greater numbers of elemental units than may be represented by single code words from said first code word group.

13. A system for generating coded representation of magnitudes which are expressed in messages of varying numbers of consecutive elemental units and wherein the probability of occurrence of each number of consecutive elemental units is governed by a probability distribution having a first set of messages for which the numbers of units have a relatively high probability of occurrence and a second set of messages with numbers of units in a relatively low probability portion of the distribution, said system comprising:
means for receiving said messages;
control circuit means for determining whether received messages are of said first or second sets;
first means for coding received messages of the first set with single code words selected from a first group of code words;
second coding means including:
means for determining whether the number of elemental units in all or part of received messages exceeds one or more predetermined sizes;
a second code word group having code words which indicate said predetermined sizes;
means for selecting a code word from said second group representative of the largest predetermined size exceeded as a code word to partially represent the message;
means for adjusting the number of elemental units in said message to reflect said partial coding of a section of said message; and
means for causing said determining means to determine whether the number of units in the adjusted message exceeds one or more predetermined sizes, for causing operation of said first coding means to complete coding of said message if no predetermined size is exceeded.

14. A system for generating coded representations of magnitudes which are expressed in messages of varying numbers of consecutive elemental units and wherein the probability of occurrence of each number of consecutive elemental units is governed by a probability distribution having a first set of messages for which the numbers of units have a relatively high probability of occurrence and a second set of messages with numbers of units in a relatively low probability portion of the distribution, said system comprising:
means for receiving said messages;
control circuit means for determining whether received messages are of said first or second sets;
first means for coding received messages of the first set with single code words selected from a first group of code words;
second means for coding received messages of the second set in sections using consecutive code words, said code words being selected from a second, different group of code words, to represent one or more of said sections not representable by said first group of code words and from said first group of code words to represent one or more of said sections representable by said first group of code words;
means responsive to coded message outputs of said first and second coding means to respectively regenerate messages composed of numbers of elemental units;
said regenerating means providing a first message section whose number of elemental units is defined in said first group of code words by a code word from said first coding means;
said regenerating means being further operative in response to a coded message output from said second coding means to provide a first section of a message for each code word from said first group of code words and one or more second sections whose numbers of elemental units are defined in said second group of code words.

15. The system for generating coded representations of claim 14 wherein:

said elemental units in said messages alternate in characteristics from message to message; and said regenerating means is operative to correspondingly alternate the characteristics of the elemental units in the regenerated messages in response to each occurrence of a coded output from said first coding means.

16. A method of coding messages represented by symbols and wherein said symbols occur in groupings having varying probabilities of occurrence, said method comprising the steps of:

receiving said symbol groupings;

classifying each received symbol grouping into first and second classes according to a predetermined probability of occurrence for each grouping;

providing a first code word coding vocabulary having a plurality of code words each corresponding to a predetermined symbol grouping;

coding received symbol groupings of the first class into single code words selected from said first code word vocabulary to completely represent said groupings of the first class; and providing a second code word coding vocabulary having at least one code word corresponding to a symbol grouping not representable by a code word from said first code word vocabulary; and coding received symbol groupings of the second class into one or more code words selected from a second code word vocabulary including at least some code words of said first code word vocabulary and additional code words representing preselected portions of the symbol groupings of said second class not representable by code words from said first code word vocabulary.

17. The method for coding messages of claim 16 further including the steps of:

responding to code words to identify code words from said first code word vocabulary;

generating message symbols for at least a partial message from each code word from said first code word vocabulary; and generating symbols to complete the partial messages from associated code words from said second code word vocabulary.

18. The method of coding messages of claim 16 further including the steps of:

terminating the coding of the second class of message groupings by selecting the last code word therefor from said first code word vocabulary.

19. The method of coding messages of claim 16 wherein said first and second classes of symbol groupings comprise groupings of high and low probability of occurrence respectfully.

20. A method of generating coded representations of magnitudes which are expressed in messages of varying numbers of consecutive elemental units and wherein the probability of occurrence of each number of consecutive elemental units is governed by a probability distribution having a first set of messages for which the numbers of units have a relatively high probability of occurrence and a second set of messages for which the numbers of units occur in a relatively low probability portion of the distribution, said method comprising the steps of:

receiving said messages;

determining whether said received messages are of said first or second sets;

coding received messages of the first set with single code words selected from a first group of code words;

providing a second, different group of code words having code words which represent at least on section of a number of consecutive elemental units for which no code word from said first group is appropriate; and coding received messages of the second set in sections using consecutive code words, said code words being selected from said second, different group of code words to represent one or more of said sections not representable by said first group of code words and from said first group of code words to represent one or more of said sections representable by said first group of code words.

21. The method of coding messages as set forth in claim 20 wherein said second mentioned coding step in coding message sections with code words from said second code word group includes the step of selecting code words representative of sections having substantially greater numbers of elemental units than may be represented by single code words from said first code word group.

22. The method of claim 21 wherein said second code word group includes code word representing increasingly larger numbers of elemental units and further wherein said code words from said second group permit said second mentioned coding step to encode all numbers of elemental units up to a predetermined number in two code words.

* * * * *